United States Patent [19]
Murakami et al.

[11] Patent Number: 5,608,754
[45] Date of Patent: Mar. 4, 1997

[54] LASER RESONATOR

[75] Inventors: Takafumi Murakami; Yasuyuki Morita, both of Yamanashi; Norio Karube, Machida, all of Japan

[73] Assignee: Fanuc Ltd., Yamanashi, Japan

[21] Appl. No.: 539,689

[22] Filed: Oct. 5, 1995

[30] Foreign Application Priority Data

Nov. 2, 1994 [JP] Japan ................................ 6-269856

[51] Int. Cl.$^6$ .............................. H01S 3/081; H01S 3/08; H01S 3/03
[52] U.S. Cl. ................ 372/93; 372/107; 372/65
[58] Field of Search .................... 372/58, 62, 63, 372/65, 93, 103, 107, 72; 362/263, 294

[56] References Cited

U.S. PATENT DOCUMENTS

| | | | |
|---|---|---|---|
| 3,889,209 | 6/1975 | Lavarini | 372/103 |
| 4,672,620 | 6/1987 | Slusher et al. | 372/34 X |

Primary Examiner—Rodney B. Bovernick
Assistant Examiner—Luong-Quyen T. Phan
Attorney, Agent, or Firm—Staas & Halsey

[57] ABSTRACT

A laser resonator allows internal optical mirrors to be cleaned easily and minimizes any contamination of the internal optical mirrors. The laser resonator has normally closed cleaning windows disposed immediately in front of output, rear, and folding mirrors for inserting a cleaning instrument therethrough for cleaning these mirrors. A gas inlet discharge tube holder has a discharge tube coupling which interconnects the spaces in parallel discharge tubes for transmitting a laser beam therethrough. The gas inlet discharge tube holder also has a gas flow bypass for bypassing a laser gas that circulates through the discharge tubes. The internal optical mirrors can be cleaned easily with a cleaning instrument inserted through the cleaning windows. As the internal optical mirrors do not need to be removed for cleaning, they and an external optical system are not required to be readjusted for alignment of their optical axes. Any contamination of the internal optical mirrors is minimized because no laser gas flow is caused in the discharge tube coupling.

5 Claims, 3 Drawing Sheets

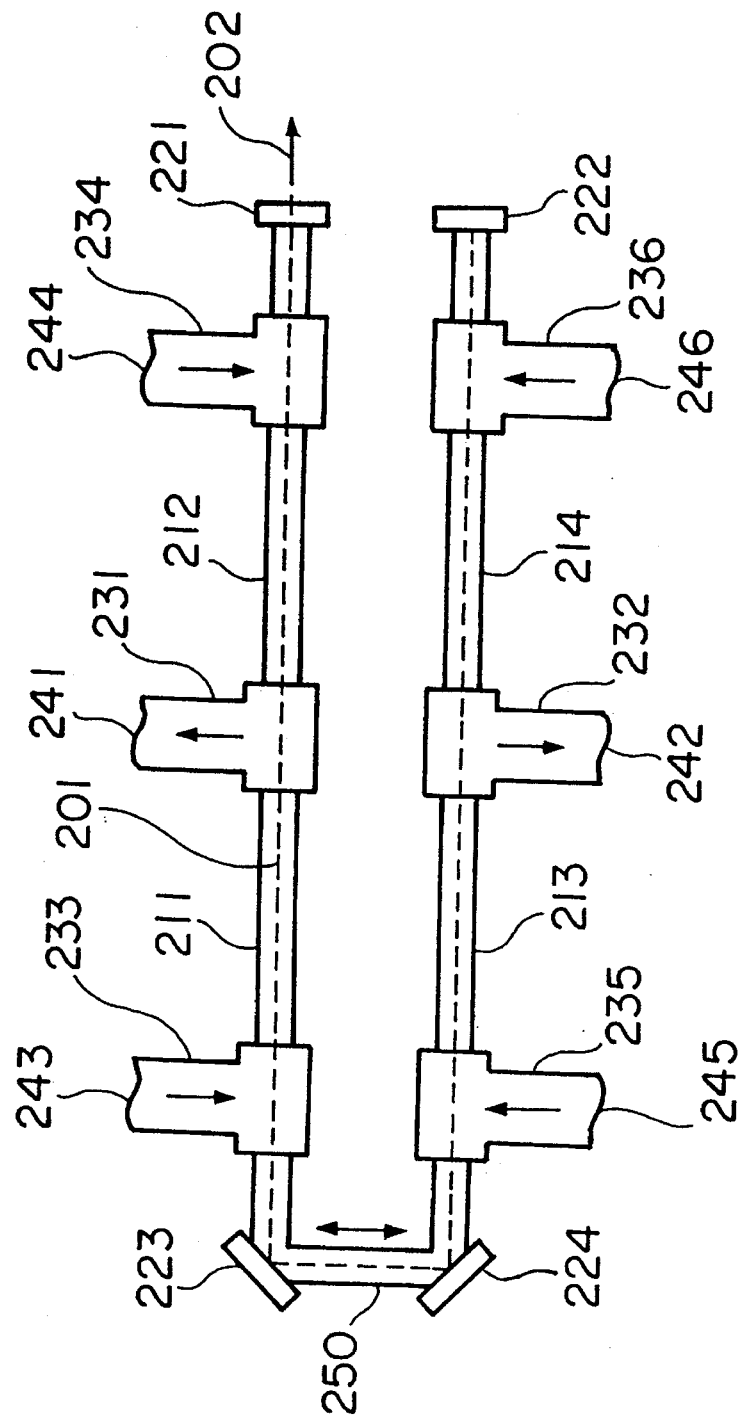

LASER RESONATOR

BACKGROUND OF THE INVENTION

1. Field of the Invention

The present invention relates to a laser resonator for exciting a laser gas in a discharge tube to emit a laser beam, and more particularly to a multiple-folded laser resonator.

2. Description of the Related Art

Gas lasers such as carbon dioxide lasers are capable of producing high output emissions at high energy efficiencies. Since such gas lasers have good beam characteristics, they can machine workpieces to complex shapes at high speeds under the control of numerical control systems. Therefore, the gas lasers are widely used as machining apparatus in the art.

Many gas lasers employ multiple-folded gas laser resonators because they need a wide discharge range in order to produce high output emissions.

FIG. 3 of the accompanying drawings schematically shows a conventional laser resonator. The illustrated laser resonator is designed for use in a multiple-folded fast-axial-flow $CO_2$ gas laser combined with a machining nozzle.

As shown in FIG. 3, the laser resonator has a total of four discharge tubes 211–214, with the discharge tubes 211, 212 being connected in series with each other by a gas outlet discharge tube holder 231 and the discharge tubes 213, 214 being connected in series with each other by a gas outlet discharge tube holder 232. The interconnected pair of discharge tubes 211, 212 and the interconnected pair of discharge tubes 213, 214 are disposed parallel to each other. The opposite ends of the interconnected pairs of discharge tubes 211–214 are fixed in position by gas inlet discharge tube holders 233–236. The gas outlet discharge tube holders 231, 232 have respective gas outlets 241, 242, and the gas inlet discharge tube holders 233–236 have respective gas inlets 243–246.

The laser resonator also has a rear mirror 222 mounted on an end of the discharge tube 214, folding mirrors 223, 224 mounted on respective ends of the discharge tubes 211, 213, and an output mirror 221 mounted on an end of the discharge tube 212. The rear mirror 222, the folding mirrors 223, 224, and the output mirror 221 will hereinafter be also referred to as internal optical mirrors. The four discharge tubes 211–214 are interconnected by a discharge tube coupling 250 disposed between the folding mirrors 223, 224. The laser resonator of the above construction functions as a single Fabry-Pérot resonator.

A laser gas to be introduced into the discharge tubes 211–214 is compressed by an air blower of the laser and then sent to a circulatory system. In the circulatory system, the laser gas is cooled to a desired temperature, which is substantially equal to an ordinary temperature, by a heat exchanger which deprives the laser gas of the heat produced when it was compressed. The laser gas that is maintained at the constant temperature is then introduced from the gas inlets 243–246 into the discharge tubes 211–214.

The introduced laser gas flows in the discharge tubes 211–214 from the gas inlet discharge tube holders 233–236 toward the gas outlet discharge tube holders 231, 232 at a speed of about 200 m/sec. The fast-flowing laser gas is excited in the discharge tubes 211–214 by the application of a high-frequency discharge. When the laser gas is excited, it emits a laser beam 201 at a constant wavelength from laser gas molecules. The laser beam 201 is amplified by resonating between the rear mirror 222 and the output mirror 221, and a portion of the amplified laser beam 201 is outputted as a high-power laser beam 202 from the output mirror 221.

The internal optical mirrors are exposed to the laser gas while the laser gas resonator is in operation. The laser gas that circulates in the circulatory system contains foreign matter such as dust, oil mist, etc. delivered from mechanical components such as the air blower. As a result, the reflecting surfaces of the internal optical mirrors tend to be contaminated by the foreign matter contained in the laser gas, and the contaminants on the internal optical mirrors are liable to lower the output power of the laser beam 202. Therefore, it is necessary to clean the contaminated internal optical mirrors at periodic intervals. In order to clean the contaminated internal optical mirrors, they have to be removed from the laser gas resonator. After being cleaned, the internal optical mirrors are installed in place in the laser gas resonator.

The optical systems in the laser gas resonator need highly strict adjustments. Therefore, when the internal optical mirrors are removed and installed again, these optical systems have to be readjusted for alignment of their optical axes. The optical axis readjustment of the optical systems is apt to cause the output laser beam to be slightly shifted off its proper optical axis. Since the shifted output laser beam is displaced out of alignment with the center of the machining nozzle, the optical axis of an external optical system which guides the output laser beam to the machining nozzle has to be readjusted. The readjustment of those optical systems is a timing-consuming task.

The laser gas which circulates in the parallel pairs of discharge tubes 211–214 tends to suffer pressure differences developed due to different tube diameters, tube lengths, and so on. The pressure differences cause the laser beam to flow in the discharge tube coupling 250, and the laser beam flow in the discharge tube coupling 250 aggravates the contamination of the reflecting surfaces of the folding mirrors 223, 224, which require frequent cleaning.

As described above, the conventional laser resonator is disadvantageous in that since the reflecting surfaces of the internal optical mirrors can be contaminated easily, the internal optical mirrors have to be cleaned frequently, and since the internal optical mirrors need to be detached when they are to be cleaned and attached again after they are cleaned, and also need to be readjusted each time they are cleaned, the cleaning process is complex and time-consuming.

SUMMARY OF THE INVENTION

It is therefore an object of the present invention to provide a laser resonator which can easily be cleaned and has a structure for reducing contamination of optical mirrors.

To achieve the above object, there is provided in accordance with the present invention a multiple-folded laser resonator for exciting a laser gas to emit a laser beam, comprising a discharge tube for containing a laser gas therein, an internal optical mirror aligned with an axis of the discharge tube, and a normally closed cleaning window positioned immediately in front of the internal optical mirror and selectively openable for allowing a cleaning instrument to be inserted therethrough for cleaning the internal optical mirror.

According to the present invention, there is also provided a multiple-folded laser resonator for exciting a laser gas to emit a laser beam, comprising a discharge tube holder having an upper panel, a first pair of confronting side panels, and a second pair of confronting side panels, a discharge tube connected to one of the confronting side panels of the first pair, an internal optical mirror mounted on the other of the confronting side panels of the first pair, a normally closed cleaning window defined in the upper panel and selectively openable for allowing a cleaning instrument to be inserted therethrough for cleaning the internal optical mirror, and a pair of laser gas inlet tubes connected respectively to the confronting side panels of the second pair.

According to the present invention, there is further provided a multiple-folded laser resonator for exciting a laser gas to emit a laser beam, comprising a plurality of parallel discharge tubes, a discharge tube coupling interconnecting spaces in the parallel discharge tubes for transmitting a laser beam therethrough, and a gas flow bypass connected parallel to the discharge tube coupling for bypassing a laser gas flow which is produced due to the difference between gas pressures in the parallel discharge tubes.

According to the present invention, there is also provided a multiple-folded laser resonator for exciting a laser gas to emit a laser beam, comprising a plurality of parallel discharge tubes, a discharge tube coupling interconnecting spaces in the parallel discharge tubes for transmitting a laser beam therethrough, a gas flow bypass connected parallel to the discharge tube coupling for bypassing a laser gas flow which is produced due to the difference between gas pressures in the parallel discharge tubes, a plurality of internal optical mirrors aligned with respective axes of the discharge tubes, and a plurality of normally closed cleaning windows positioned immediately in front of the internal optical mirrors, respectively, and selectively openable for allowing a cleaning instrument to be inserted therethrough for cleaning the internal optical mirrors.

The cleaning windows positioned immediately in front of the internal optical mirrors allow the internal optical mirrors to be easily cleaned without being removed. As the internal optical mirrors do not need to be removed for cleaning, they and an external optical system are not required to be readjusted for alignment of their optical axes.

The cleaning windows can easily be provided as the discharge tubes, the internal optical mirrors, the gas inlet tubes, and the cleaning windows are integrally disposed on the discharge tube holder.

The gas flow bypass is disposed between the parallel discharge tubes parallel to the discharge tube coupling. The gas flow bypass permits the laser gas to flow therethrough between the discharge tubes. Since no laser gas flow is developed in the discharge tube coupling, any contamination of the internal optical mirrors is minimized.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 3 is a schematic view of a conventional laser resonator.

DESCRIPTION OF THE PREFERRED EMBODIMENT

Figure 1:
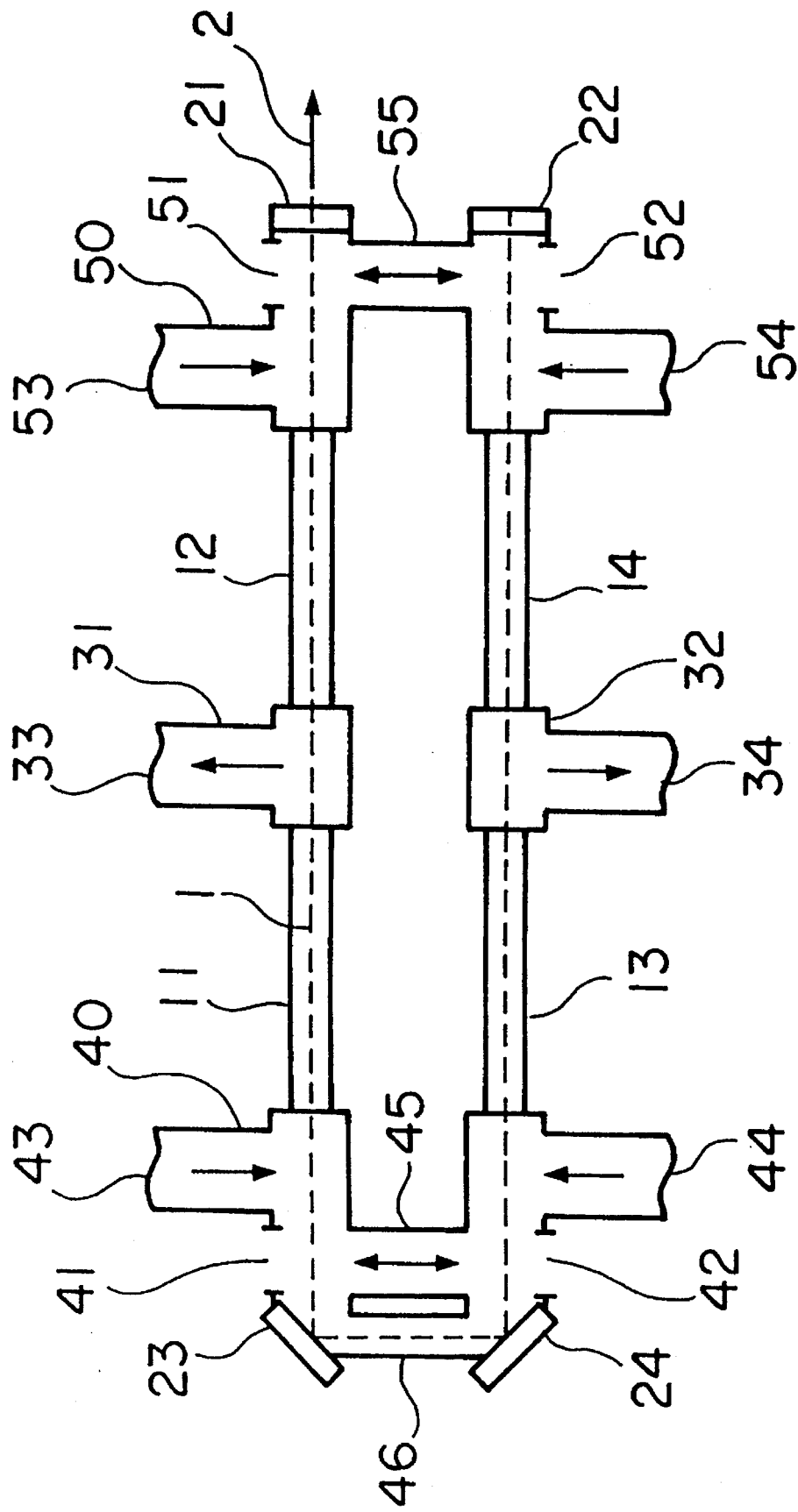
FIG. 1 is a schematic view of a laser resonator according to the present invention.

An embodiment of the present invention will hereinafter be described below. FIG. 1 schematically shows a laser resonator according to the present invention. The laser resonator shown in FIG. 1 is designed for use in a multiple-folded fast-axial-flow $CO_2$ gas laser.

As shown in FIG. 1, the laser resonator has a total of four discharge tubes 11~14, with the discharge tubes 11, 12 being connected in series with each other by a gas outlet discharge tube holder 31 and the discharge tubes 13, 14 being connected in series with each other by a gas outlet discharge tube holder 32. The interconnected pair of discharge tubes 11, 12 and the interconnected pair of discharge tubes 13, 14 are disposed parallel to each other. The gas outlet discharge tube holders 31, 32 have respective gas outlets 33, 34. The opposite ends of the interconnected pairs of discharge tubes 11~14 are fixed in position by gas inlet discharge tube holders 40, 50.

The gas inlet discharge tube holder 40 has a pair of gas inlets 43, 44. The laser resonator also has a pair of folding mirrors 23, 24 positioned in alignment with the respective axes of the discharge tubes 11, 13, with cleaning windows 41, 42 disposed in the vicinity of the respective reflecting surfaces of the folding mirrors 23, 24. The cleaning windows 41, 42 are normally closed off by respective covers when the laser resonator is in operation.

A discharge tube coupling 46 extends between the folding mirrors 23, 24. The discharge tube coupling 46 interconnects the spaces in the parallel pairs of discharge tubes 11~14. Therefore, a laser beam 1 can be transmitted and a laser gas can flow through the discharge tube coupling 46. The discharge tubes 11~14 thus interconnected jointly function as a single laser resonator. A gas flow bypass 45 for allowing the laser gas to flow therethrough is integrally formed with the gas inlet discharge tube holder 40 and is disposed between the gas inlets 43, 44 of the gas inlet discharge tube holder 40. The gas flow bypass 45 imposes a resistance on the laser gas flow which is at most a quarter of the resistance which is imposed on the laser gas flow by the discharge tube coupling 46.

Therefore, if the resistance imposed on the laser gas flow by the gas flow bypass 45 is represented by $R_1$ and the resistance imposed on the laser gas flow by the discharge tube coupling 46 is represented by $R_2$, then these resistances $R_1$, $R_2$ satisfy the following relationship:

$$R_1/R_2 \leq \tfrac{1}{4} \qquad (1)$$

The gas inlet discharge tube holder 50 has a pair of gas inlets 53, 54. The laser resonator also has an output mirror 21 positioned in alignment with the axis of the discharge tube 12, and a rear mirror 22 positioned in alignment with the axis of the discharge tube 14. Cleaning windows 51, 52 are disposed in the vicinity of the respective front surfaces of the output and rear mirrors 21, 22. The cleaning windows 51, 52 are normally closed off by respective covers when the laser resonator is in operation. A gas flow bypass 55 for allowing the laser gas to flow therethrough is disposed between the gas inlets 53, 54 of the gas inlet discharge tube holder 50.

The laser resonator shown in FIG. 1 functions as a Fabry-Pérot resonator.

A laser gas to be introduced into the discharge tubes 11~14 is compressed by an air blower of the laser and then sent to a circulatory system. In the circulatory system, the laser gas is cooled to a desired temperature, which is substantially equal to an ordinary temperature, by a heat exchanger which deprives the laser gas of the heat produced when it was compressed. The laser gas that is maintained at the constant temperature is then introduced from the gas inlets 43, 44, 53, 54 into the discharge tubes 11~14.

The introduced laser gas flows in the discharge tubes 11~14 from the gas inlet discharge tube holders 40, 50 toward the gas outlet discharge tube holders 31, 32 at a speed of about 200 m/sec. At this time, the gas pressure in the discharge tubes 11, 12 and the gas pressure in the discharge tubes 13, 14 are uniformized by the gas flow bypasses 45, 55.

The fast-flowing laser gas is excited in the discharge tubes 11~14 by the application of a high-frequency discharge. When the laser gas is excited, it emits a laser beam 1 at a constant wavelength from laser gas molecules. The laser beam 1 is amplified by resonating between the rear mirror 22 and the output mirror 21, and a portion of the amplified laser beam 1 is outputted as a high-power laser beam 2 from the output mirror 21.

In the event that a pressure difference is developed between the gas pressure in the discharge tubes 11, 12 and the gas pressure in the discharge tubes 13, 14, the laser gas flows from a higher-pressure region to a lower-pressure region through the gas flow bypasses 45, 55. Consequently, almost no laser gas flow is produced in the discharge tube coupling 46, and the amount of any laser gas which flows in the vicinity of the reflecting surfaces of the folding mirrors 23, 24 is very small. Therefore, the reflecting surfaces of the folding mirrors 23, 24 are subject to highly limited contamination by foreign matter such as dust contained in the laser gas.

If the reflecting surfaces of the internal optical mirrors, i.e., the reflecting surfaces of the output mirror 21, the folding mirrors 23, 24, and the rear mirror 22, are contaminated, then the cleaning windows 41, 42, 51, 52 are opened, and a cleaning instrument such as a swab is inserted through the cleaning windows 41, 42, 51, 52 and cleans the reflecting surfaces of the internal optical mirrors. Therefore, the reflecting surfaces of the internal optical mirrors can easily be cleaned without removing the internal optical mirrors from the laser resonator. Since the internal optical mirrors are not detached from the laser resonator, their positions are not displaced, and hence the internal optical mirrors and external optical systems are not required to be readjusted for alignment of their optical axes.

In the arrangement shown in FIG. 1, the two pairs of discharge tubes are disposed parallel to each other. However, the present invention is also applicable to a multiple-folded laser resonator composed of more discharge tubes disposed parallel to each other.

Figure 2:
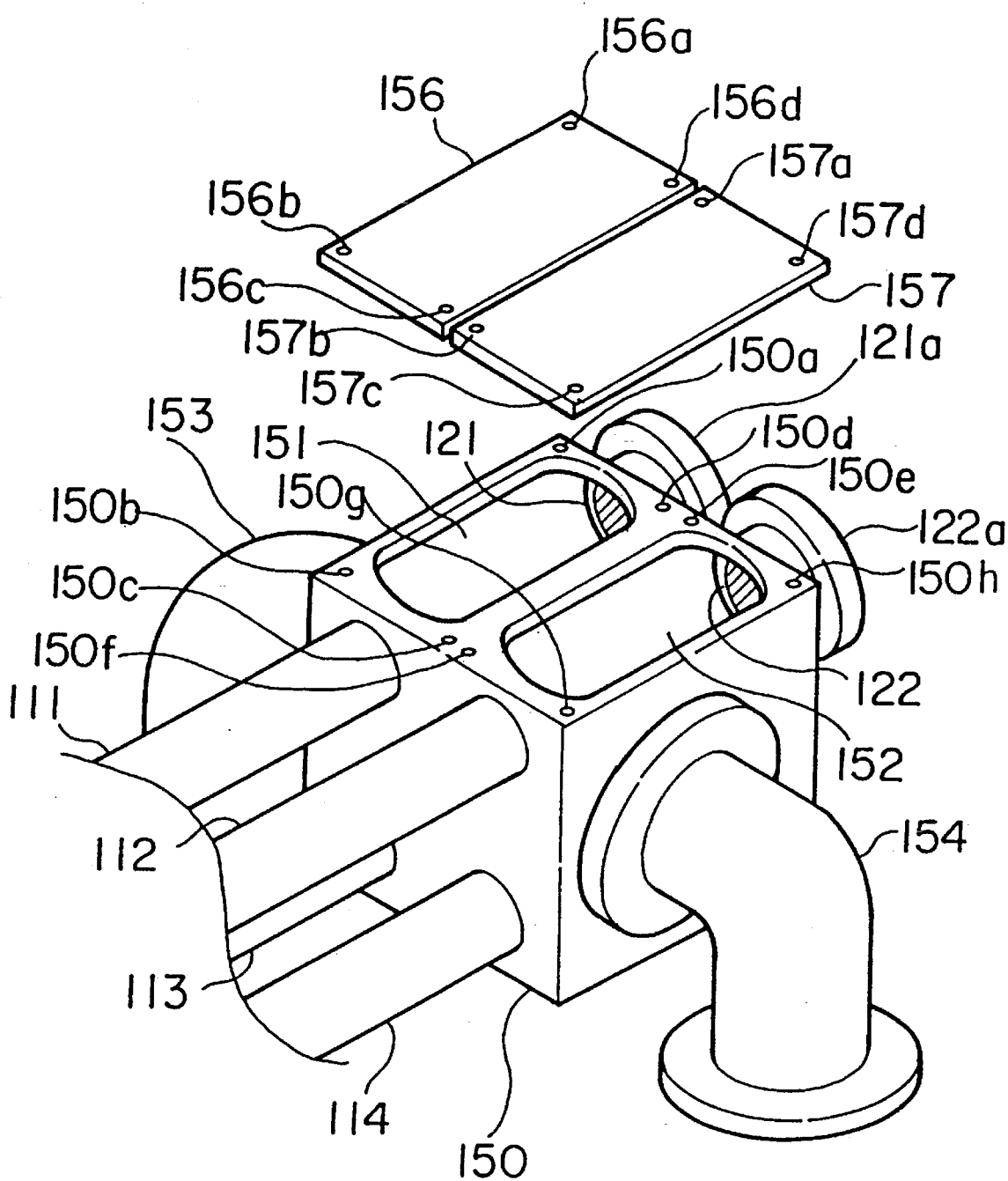
FIG. 2 is a perspective view of a gas inlet discharge tube holder for use in a multiple-folded laser resonator.

FIG. 2 schematically shows a gas inlet discharge tube holder for use in a multiple-folded laser resonator.

As shown in FIG. 2, four discharge tubes 111~114 are fixed to one side panel of a gas inlet discharge tube holder 150. Confronting gas inlet tubes 153, 154 are connected to respective confronting side panels of the gas inlet discharge tube holder 150.

On a side panel of the gas inlet discharge tube holder 150 which confronts and is remote from the panel to which the discharge tubes 111~114 are fixed, there are mounted an output mirror 121 aligned with the axis of the discharge tube 111 and supported by a mirror holder 121a, a rear mirror 122 aligned with the axis of the discharge tube 112 and supported by a mirror holder 122a, and two folding mirrors (not shown) aligned with the respective axes of the discharge tubes 113, 114. The gas inlet discharge tube holder 150 has cleaning windows 151, 152 defined in a panel thereof immediately in front of the output mirror 121 and the rear mirror 122, respectively. The cleaning windows 151, 152 are in the form of elongate holes which longitudinally extend toward the output mirror 121 and the rear mirror 122 for allowing cleaning instruments to clean the reflecting surfaces of the output mirror 121 and the rear mirror 122 with ease.

The cleaning windows 151, 152 are normally closed by respective covers 156, 157 when the laser resonator is in operation. The covers 156, 157 have respective sets of holes 156a~156d, 157a~157d defined therein at respective corners thereof. The gas inlet discharge tube holder 150 has screw holes 150a~150h defined therein at respective positions aligned with the holes 156a~156d, 157a~157d. The covers 156, 157 can be fastened to the gas inlet discharge tube holder 150 by screws (not shown) that are threaded through the holes 156a~156d, 157a~157d into the screw holes 150a~150h. Gaskets or the like (not shown) are inserted between the covers 156, 157 and the gas inlet discharge tube holder 150 to hermetically seal the gas inlet discharge tube holder 150.

In the gas inlet discharge tube holder 150, there is a wide through space extending between the gas inlet tubes 153, 154 for use as a gas flow bypass for allowing a laser gas to flow therethrough between the gas inlet tubes 153, 154.

Since the wide gas flow bypass is present between the gas inlet tubes 153 and 154, gas pressures from the gas inlet tubes 153, 154 are uniformized in the gas inlet discharge tube holder 150. Therefore, the amount of a laser gas flowing through a laser beam passage between folding mirrors is so small that any contamination of the internal optical mirrors is minimized to prevent the output power of a laser beam from being lowered.

Specifically, any contamination of the internal optical mirrors is so reduced that the laser resonator according to the present invention may be serviced at a maintenance interval of about 4600 hours whereas the conventional laser resonator needs to be serviced at a maintenance interval of about 2000 hours.

If the reflecting surfaces of the internal optical mirrors are contaminated, then the covers 156, 157 are detached, and a cleaning instrument such as a swab is inserted through the cleaning windows 151, 152 and cleans the reflecting surfaces of the internal optical mirrors. Therefore, the reflecting surfaces of the internal optical mirrors can easily be cleaned without removing the internal optical mirrors from the laser resonator. As a consequence, the internal optical mirrors and external optical systems are not required to be readjusted for alignment of their optical axes, and hence the maintenance can be carried out highly efficiently.

According to the present invention, therefore, the maintenance interval at which the laser resonator is serviced is more than twice the maintenance interval at which the conventional laser resonator is serviced, and the period of time required to service the laser resonator is very short.

In the illustrated embodiment, one gas flow bypass is disposed between two gas flow inlets of a discharge tube holder. However, a plurality of gas flow bypasses may be disposed between two gas flow inlets of a discharge tube holder.

According to the present invention, as described above, since the cleaning windows are provided immediately in front of the internal optical mirrors, the internal optical mirrors can easily be cleaned with a cleaning instrument through the cleaning windows without removal of the internal optical mirrors. As a result, the internal optical mirrors or optical systems are not required to be readjusted for alignment of their optical axes after they are cleaned, and hence the laser resonator can be serviced in a short period of time.

The circulatory system for circulating the laser gas introduced from the plural gas inlets includes a gas flow bypass for uniformizing the gas pressure in the discharge tubes. Consequently, any contamination of the internal optical mirrors by foreign matter such as dust or the like contained in the laser gas is minimized, making allowing the laser resonator to be serviced at an increased maintenance interval.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A multiple-folded laser resonator for exciting a laser gas to emit a laser beam, comprising:

a discharge tube for containing a laser gas therein;

an internal optical mirror aligned with an axis of said discharge tube; and a normally closed cleaning window positioned immediately in front of said internal optical mirror and selectively openable for allowing a cleaning instrument to be inserted therethrough for cleaning the internal optical mirror.

2. A multiple-folded laser resonator for exciting a laser gas to emit a laser beam, comprising:

a discharge tube holder having an upper panel, a first pair of confronting side panels, and a second pair of confronting side panels;

a discharge tube connected to one of the confronting side panels of the first pair;

an internal optical mirror mounted on the other of the confronting side panels of the first pair;

a normally closed cleaning window defined in said upper panel and selectively openable for allowing a cleaning instrument to be inserted therethrough for cleaning the internal optical mirror; and a pair of laser gas inlet tubes connected respectively to said confronting side panels of the second pair.

3. A multiple-folded laser resonator according to claim 2, wherein said cleaning window comprises an elongate hole longitudinally extending toward said internal optical mirror.

4. A multiple-folded laser resonator for exciting a laser gas to emit a laser beam, comprising:

a plurality of parallel discharge tubes;

a discharge tube coupling interconnecting spaces in said parallel discharge tubes for transmitting a laser beam therethrough;

a gas flow bypass connected parallel to said discharge tube coupling for bypassing a laser gas flow which is produced due to the difference between gas pressures in said parallel discharge tubes;

a plurality of internal optical mirrors aligned with respective axes of said discharge tubes; and a plurality of normally closed cleaning windows positioned immediately in front of said internal optical mirrors, respectively, and selectively openable for allowing a cleaning instrument to be inserted therethrough for cleaning the internal optical mirrors.

5. A multiple-folded laser resonator according to claim 4, wherein a resistance $R_1$ imposed on the laser gas by said gas flow bypass and a resistance $R_2$ imposed on the laser gas by said discharge tube coupling satisfy the following relationship:

$$R_1/R_2 \leq 1/4.$$

* * * * *